(12) United States Patent
Shin

(10) Patent No.: US 12,057,769 B2
(45) Date of Patent: Aug. 6, 2024

(54) DC-DC CONVERTER FOR REDUCING VOLTAGE RIPPLE OF OUTPUT VOLTAGE AND METHOD OF CONTROLLING THE SAME

(71) Applicant: Chung Ang University Industry Academic Cooperation Foundation, Seoul (KR)

(72) Inventor: Jongwon Shin, Seoul (KR)

(73) Assignee: CHUNG ANG UNIVERSITY INDUSTRY ACADEMIC COOPERATION FOUNDATION, Seoul (KR)

( * ) Notice: Subject to any disclaimer, the term of this patent is extended or adjusted under 35 U.S.C. 154(b) by 251 days.

(21) Appl. No.: 17/716,024

(22) Filed: Apr. 8, 2022

(65) Prior Publication Data
US 2023/0071412 A1    Mar. 9, 2023

(30) Foreign Application Priority Data
Aug. 25, 2021  (KR) .................. 10-2021-0112009

(51) Int. Cl.
  H02M 1/15       (2006.01)
  H02M 1/00       (2007.01)
  (Continued)

(52) U.S. Cl.
  CPC ............ *H02M 1/15* (2013.01); *H02M 1/0025* (2021.05); *H02M 1/08* (2013.01); *H02M 1/14* (2013.01);
  (Continued)

(58) Field of Classification Search
  CPC .............. H02M 1/0003; H02M 1/0009; H02M 1/0025; H02M 1/0054; H02M 1/0067;
  (Continued)

(56) References Cited

U.S. PATENT DOCUMENTS 5,929,692 A  *  7/1999  Carsten ................. H02M 1/15
                                                 327/551
2016/0211750 A1 *  7/2016  Coleman ............... H02M 3/158
  (Continued)

FOREIGN PATENT DOCUMENTS

JP       63-228977 A      9/1988
JP    2019-140714 A      8/2019
  (Continued)

OTHER PUBLICATIONS

Kim, Doogwook; Shin, Joonho; Shin, Jong-Won; "Soft-Switching Auxiliary Current Control for Improving Load TransientResponse of Buck Converter"; Aug. 18, 2020; Korea Science; The Korean Institute of Power Electronics (Proceedings of the KIPE Conference); pp. 160-162 (Year: 2020).*

(Continued)

*Primary Examiner* — Thienvu V Tran
*Assistant Examiner* — Shahzeb K Ahmad
(74) *Attorney, Agent, or Firm* — NKL LAW; Jae Youn Kim

(57) ABSTRACT

An auxiliary circuit for reducing an output voltage ripple of a DC-DC converter includes: a capacitor configured to perform charging and discharging, a main buck converter including a first switch and a second switch connected to a voltage source, and a first inductor connected between the capacitor and a contact point of the first switch and the second switch, the first inductor having a first inductor current that flows therethrough, and an auxiliary buck converter including a third switch and a fourth switch respectively connected to the first switch and the second switch in parallel, and a second inductor connected between the capacitor and a contact point of the third switch and the fourth switch, the second inductor having a second inductor current that flows therethrough, and the auxiliary buck (Continued)

converter configured to control the second inductor current by generating two envelopes with different heights to compensate for a difference between the first inductor current and an output current.

6 Claims, 14 Drawing Sheets

(51) Int. Cl.
  *H02M 1/08* (2006.01)
  *H02M 1/14* (2006.01)
  *H02M 3/156* (2006.01)
  *H02M 3/158* (2006.01)
(52) U.S. Cl.
  CPC ......... *H02M 3/1566* (2021.05); *H02M 3/158* (2013.01); *H02M 3/1582* (2013.01); *H02M 3/1584* (2013.01); *H02M 3/1586* (2021.05)
(58) Field of Classification Search
  CPC ........ H02M 1/0095; H02M 1/08; H02M 1/14; H02M 1/15; H02M 3/156; H02M 3/1566; H02M 3/158; H02M 3/1582; H02M 3/1584; H02M 3/1586
  See application file for complete search history.

(56) References Cited

U.S. PATENT DOCUMENTS

| | | | | |
|---|---|---|---|---|
| 2017/0207723 | A1* | 7/2017 | Zhang | ............... H02M 1/12 |
| 2017/0302172 | A1* | 10/2017 | Peretz | ............... H02M 3/156 |

FOREIGN PATENT DOCUMENTS

| | | | |
|---|---|---|---|
| KR | 10-1804773 | B1 | 12/2017 |
| KR | 10-1989936 | B1 | 6/2019 |
| KR | 10-2021-0046161 | A | 4/2021 |

OTHER PUBLICATIONS

S. Saggini; M. Ghioni; A. Geraci; "An innovative digital control architecture for low-Voltage, high-current DC-DC converters with tight voltage regulation"; Jan. 30, 2004; IEEE; IEEE Transactions on Power Electronics ( vol. 19, Issue: 1, Jan. 2004); pp. 210-218 (Year: 2004).*

Zhaoyang Zhao; Weiguo Lu; Weiming Chen; Xiong Du; Herbert Ho-Ching lu; "Multi-Period Frame Transient Switching Control for Low-Voltage High-Current Buck Converter With a Controlled Coupled Inductor"; Jan. 1, 2019; IEEE; IEEE Transactions on Power Electronics (vol. 34, Issue: 10); 9743-9757 (Year: 2019).*

Weiguo Lu; Zhaoyang Zhao; Yixiao Ruan; Shaoling Li; Herbert Ho-Ching lu; "Two-Period Frame Transient Switching Control for Buck Converter Using Coupled-Inductor Auxiliary Circuit"; Dec. 7, 2018; IEEE; IEEE Transactions on Industrial Electronics ( vol. 66, Issue: 10); 8040-8050 (Year: 2018).*

Eric Meyer; Zhiliang Zhang; Yan-Fei Liu; "Digital Charge Balance Controller to Improve the Loading/Unloading Transient Response of Buck Converters"; Jan. 13, 2011; IEEE; IEEE Transactions on Power Electronics ( vol. 27, Issue: 3, Mar. 2012); pp. 1314-1326 (Year: 2011).*

Yue Wen; Olivier Trescases; "DC-DC Converter With Digital Adaptive Slope Control in Auxiliary Phase for Optimal Transient Response and Improved Efficiency"; Dec. 26, 2011; IEEE; IEEE Transactions on Power Electronics ( vol. 27, Issue: 7, Jul. 2012); pp. 3396-3409 (Year: 2011).*

Weiguo Lu; Weiming Chen; Yixiao Ruan; Herbert Ho-Ching lu; "An Auxiliary-Parallel-Inductor-Based Sequence Switching Control to Improve the Load Transient Response of Buck Converters"; Jun. 13, 2018; IEEE; IEEE Transactions on Industrial Electronics ( vol. 66, Issue: 4, Apr. 2019); pp. 2776-2784 (Year: 2018).*

Zhenyu Shan et al., "Augmented Buck Converter Design using Resonant Circuits for Fast Transient Recovery", IEEE Transactions on Power Electronics, vol. 31, No. 8, Aug. 2016, pp. 5666-5679.

* cited by examiner

State 1 [$t_1$-$t_2$]

State 2 [$t_2$-$t_3$]

State 3 [$t_3$-$t_4$]

DC-DC CONVERTER FOR REDUCING VOLTAGE RIPPLE OF OUTPUT VOLTAGE AND METHOD OF CONTROLLING THE SAME

CROSS-REFERENCE TO RELATED APPLICATION

This application claims priority to and the benefit of Korean Patent Application No. 10-2021-0112009, filed on Aug. 25, 2021, the disclosure of which is incorporated herein by reference in its entirety.

BACKGROUND

1. Field of the Invention

The present disclosure relates to a DC-DC converter for reducing an output voltage ripple and a method of controlling the same, and more specifically, to high-efficiency and high-precision driving of an auxiliary circuit for reducing an output voltage ripple of a DC-DC converter, which relates to a technology capable of precisely suppressing a ripple of an output voltage to a very low level while increasing the driving efficiency of an auxiliary circuit itself.

2. Discussion of Related Art

A general DC-DC converter circuit can convert DC power to DC power of a different magnitude. A widely used buck converter among these DC-DC converters is mainly used to convert a high DC voltage to a low DC voltage as a non-isolated step-down converter.

Meanwhile, such a buck converter is used in various fields, such as in a power supply device for a computing apparatus, a server apparatus, or an electric propulsion system such as an electric vehicle or an electric ship, etc. Specifically, a buck converter is mostly used in a voltage regulator module (VRM) as a power supply device for a central processing unit or a graphic processing unit of a computing apparatus.

However, when this buck converter is not provided with an auxiliary circuit, there is a limit in reduction of a ripple voltage, and even when the ripple voltage is reduced by including the auxiliary circuit, it is known that power conversion efficiency is low when the operation of the auxiliary circuit is controlled by a hard switching method.

Meanwhile, the buck converter has relatively high efficiency when the operation of the auxiliary circuit is controlled by a soft switching method, but has a disadvantage in that a design and a control method of the auxiliary circuit are complicated. Further, there is a disadvantage in that control is difficult when a load current is changed into various forms other than a stepwise form.

Accordingly, an auxiliary circuit that can be applicable to an actual converter with a simple design and control method, but with time delay and parasitic components is required.

(Patent Document 1) KR 10-2021-0046161 A
(Non-Patent Document 1) Z. Shan, S. Tan, C. K. Tse and J. Jatskevich, "Augmented Buck Converter Design using Resonant Circuits for Fast Transient Recovery," in IEEE Transactions on Power Electronics, vol. 31, no. 8, pp. 5666-5679, August 2016.

SUMMARY OF THE INVENTION

Accordingly, the present disclosure is directed to providing an auxiliary circuit for reducing an output voltage ripple of a DC-DC converter.

Also, the present disclosure is directed to providing a driving method of an auxiliary circuit for reducing an output voltage ripple of a DC-DC converter.

According to an aspect of the present disclosure, there is provided a DC-DC converter for reducing an output voltage ripple according to one embodiment including: a capacitor configured to perform charging and discharging; a main buck converter including a first switch and a second switch connected to a voltage source, and a first inductor connected between a contact point of the first switch and the second switch and the capacitor so that a first inductor current flows therethrough; and an auxiliary buck converter including a third switch and a fourth switch respectively connected to the first switch and the second switch in parallel, and a second inductor connected between a contact point of the third switch and the fourth switch and the capacitor so that a second inductor current flows therethrough, and configured to control the second inductor current by generating two envelopes having different heights to compensate for a difference between the first inductor current and an output current.

In the embodiment of the present disclosure, the auxiliary buck converter may control the second inductor current by selectively using the two envelopes.

In the embodiment of the present disclosure, the auxiliary buck converter may control the second inductor current in the form of a triangular wave in the selected envelope.

In the embodiment of the present disclosure, the auxiliary buck converter may select and control a higher envelope of the two envelopes to form a first triangular wave of the second inductor current.

In the embodiment of the present disclosure, the auxiliary buck converter may select and control a lower envelope of the two envelopes to form second and subsequent triangular waves of the second inductor current.

In the embodiment of the present disclosure, the auxiliary buck converter may further include: a first envelope generator configured to generate a first envelope by using the first inductor current and the output current; and a second envelope generator configured to generate a second envelope by using the first inductor current and the output current.

In the embodiment of the present disclosure, the first envelope generator and the second envelope generator may be implemented by either an analog circuit or a digital code instruction.

In the embodiment of the present disclosure, the auxiliary buck converter may control an output voltage to be constant even when the output current fluctuates.

According to another aspect of the present disclosure, there is provided a method of controlling a DC-DC converter to reduce an output voltage ripple through an auxiliary buck converter connected to a main buck converter in parallel, the method including: generating two envelopes with different heights by using a first inductor current and an output current generated from the DC-DC converter; selecting a first envelope, which is higher of the two envelopes, to control a second inductor current; using a triangular wave in the first envelope to form a first triangular wave of the second inductor current; selecting a second envelope, which is lower of the two envelopes, to control the second inductor current; and using a triangular wave in the second envelope to form second and subsequent triangular waves of the second inductor current.

In the embodiment of the present disclosure, generating two envelopes with different heights may be implemented by either an analog circuit or a digital code instruction.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
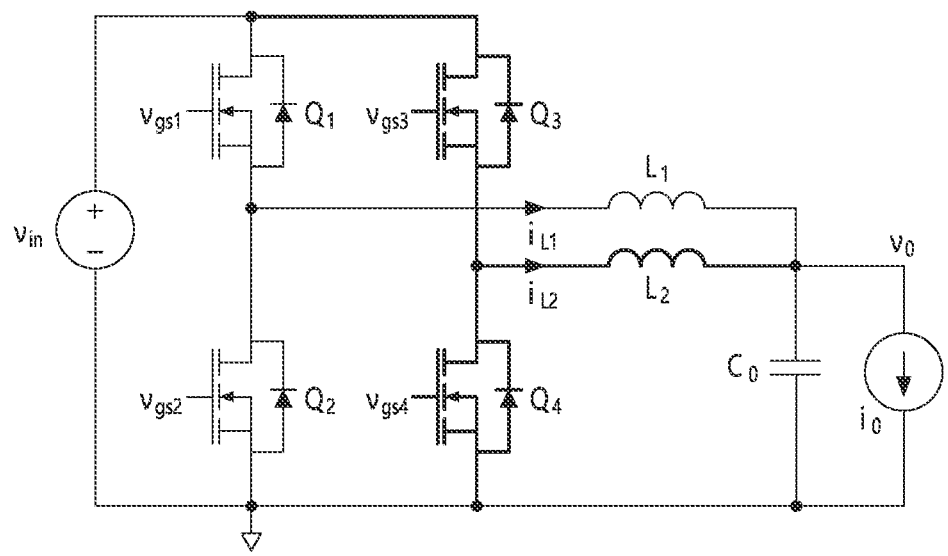
FIG. 1 is a circuit diagram of a DC-DC converter including a main buck converter and an auxiliary buck converter.

The following detailed description of the present disclosure refers to the accompanying drawings illustrating specific embodiments in which the present disclosure may be performed by way of example. These embodiments are described in detail so that those skilled in the art may sufficiently perform the present disclosure. It should be understood that the various embodiments of the present disclosure are different but need not be mutually exclusive. For example, specific shapes, structures, and characteristics described herein with respect to one embodiment may be implemented in other embodiments without departing from the spirit and scope of the present disclosure. Further, it should be understood that a position or disposition of an individual component in each disclosed embodiment may be changed without departing from the spirit and scope of the present disclosure. Accordingly, the following detailed description is not intended to be taken in a limiting sense, and the scope of the present disclosure is limited only by the appended claims, in addition to all scope equivalent to the claims when appropriately described. Similar reference numerals in the drawings indicate the same or similar functions throughout the various aspects.

Hereinafter, preferable embodiments of the present disclosure will be described in more detail with reference to the accompanying drawings.

FIG. 1 is a circuit diagram of a DC-DC converter including a main buck converter and an auxiliary buck converter.

Figure 2:
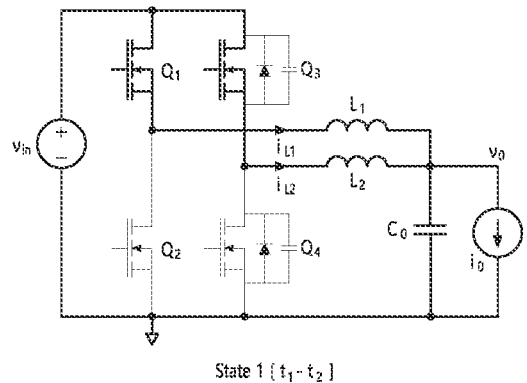
FIG. 2 is a view illustrating a mode-specific operation and a main waveform of a DC-DC converter circuit in FIG. 1.
Figure 2:
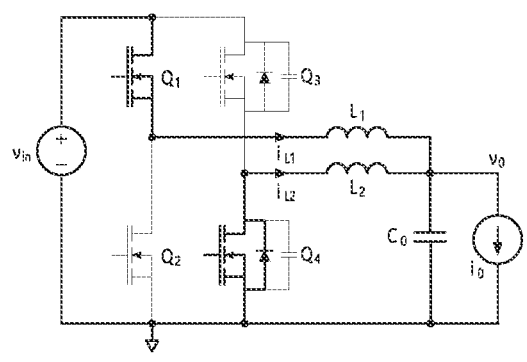
Figure 2:
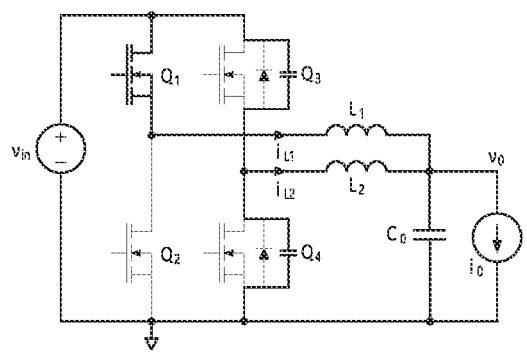
Figure 2:
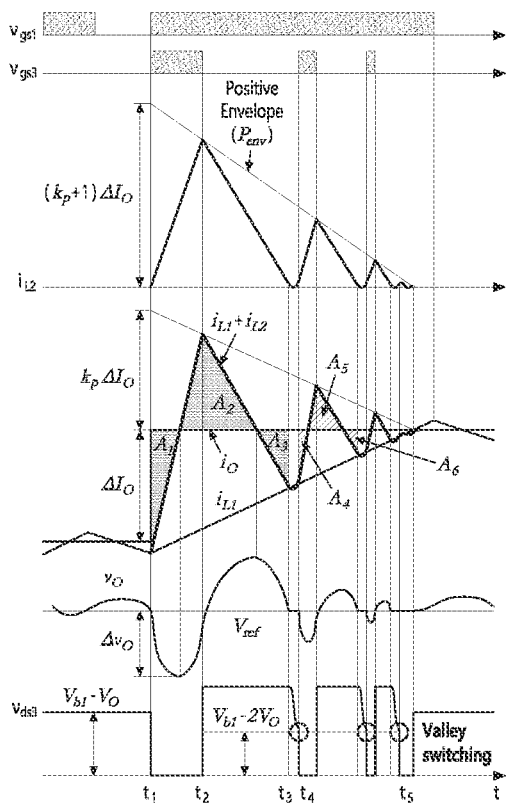

FIG. 2 is a view illustrating a mode-specific operation and a main waveform of a DC-DC converter circuit of FIG. 1.

When a load current (an output current) of a converter fluctuates, an output voltage of the converter does not maintain a constant value but fluctuates, and the present disclosure proposes an auxiliary circuit for controlling a DC-DC converter in order to suppress the fluctuation (ripple).

Referring to FIG. 1, a first switch $Q_1$, a second switch $Q_2$, and a first inductor $L_1$ constitute the main buck converter, and a third switch $Q_3$, a fourth switch $Q_4$ and a second inductor $L_2$ constitute the auxiliary buck converter (or auxiliary circuit). These converters are driven to maintain the output voltage $v_O$ constant even when an output current $i_O$ fluctuates.

The main buck converter and the auxiliary buck converter may be connected in parallel with the same type of circuit. A voltage source $V_{in}$ may supply DC power, and the main buck converter may be connected to the voltage source $V_{in}$.

A capacitor $C_o$ may be connected to the other end of the main buck converter to perform at least one operation of charging or discharging according to operation of the main buck converter.

Accordingly, the main buck converter may operate as a switch controlling a direction of a DC current transmitted from a contact point of at least one of the voltage source $V_{in}$ or the capacitor $C_o$ connected to the other end.

Further, the capacitor $C_o$ may rectify an AC current from an output current from the main buck converter or the auxiliary buck converter.

A load may be connected to a contact point of the main buck converter and the capacitor $C_o$, and a preset load current may flow through the load.

In this case, the load may include an external apparatus which uses DC power, and accordingly, load currents $i_O$ of different magnitudes may flow through the load, and the magnitude of the load current may vary according to operation of the load.

Here, the load may operate as a current source, and accordingly, when a current required in the load changes, it may be understood that a magnitude of the current source also changes, and it may be understood that a current flowing by the current source is the load current.

In this case, the load current $i_O$ may be appeared in various forms, such as a triangular wave, a sine wave, a sawtooth wave, a square wave, and the like.

The auxiliary buck converter is connected to the main buck converter in parallel, and may compensate for an inrush current shown up by a difference between a current flowing from the main buck converter to a contact point of the load and the capacitor $C_o$ and the load current $i_O$.

Here, the inrush current may refer to at least one element of a deficiency or excess of the output current of the main buck converter for the load current $i_O$ which may be generated while a current flowing from the main buck converter to the load follows the load current when the load current flowing through the load changes according to the operation of the load.

Accordingly, it may be understood that the auxiliary buck converter reduces a ripple phenomenon which may occur in the output voltage of the main buck converter when the load current changes according to the operation of the load.

Meanwhile, the auxiliary buck converter may operate as a switch which controls a direction in which the DC current transmitted from a contact point with at least one of the voltage source $V_{in}$ and the capacitor $C_o$ connected to the other end flows.

The main buck converter may include the first switch $Q_1$, the second switch $Q_2$, and the first inductor $L_1$.

The first switch $Q_1$ may be connected to the voltage source $V_{in}$, and the second switch $Q_2$ may be connected to the voltage source $V_{in}$ in parallel at the other end of the first switch $Q_1$.

Further, the first inductor $L_1$ may be connected to a contact point of the first switch $Q_1$ and the second switch $Q_2$, and the other end of the first inductor $L_1$ may be connected to a contact point of the capacitor $C_o$ and the load.

In this case, a semiconductor element such as a MOS field-effect transistor (MOSFET) or the like may be used as the first switch $Q_1$ and the second switch $Q_2$, and as shown in FIG. 1, each MOSFET may be provided with a diode connected to the MOSFET in parallel.

Further, a constant voltage may be input to a gate of each MOSFET so that a drain and a source of the MOSFET are conductive. In this case, the voltage source, which inputs a voltage to the gate, may be the voltage source $V_{in}$, and may include a voltage source which inputs a voltage to the gate.

Meanwhile, while the capacitor $C_o$ performs charging, the first switch $Q_1$ may be turned on and the second switch $Q_2$ may be blocked, and while the capacitor $C_o$ performs discharging, the second switch $Q_2$ may be turned on and the first switch $Q_1$ may be blocked.

Here, when the load current flowing through the load is maintained at a constant magnitude, since the charging and the discharging of the capacitor $C_o$ are alternately performed and the auxiliary buck converter is electrically blocked, the first switch $Q_1$ and the second switch $Q_2$ of the main buck converter may be alternately turned on or blocked so that the charging and the discharging is performed in the capacitor $C_o$.

In this case, the first inductor $L_1$ may be connected to the capacitor $C_o$ to operate as a low pass filter, and to this end, the first inductor $L_1$ and the capacitor $C_o$ may each be provided in a size sufficient to stably supply a current to the load.

Meanwhile, when the load current flowing through the load increases according to the operation of the load, the first switch $Q_1$ may be turned on and the second switch $Q_2$ may be blocked, and a state of each of the first switch $Q_1$ and the second switch $Q_2$ may be maintained while an inrush current, generated due to a difference between the current flowing in the first inductor $L_1$ (hereinafter, a first inductor current, $i_{L1}$) due to an increase in the load current and the load current $i_O$, is present.

In this regard, the inrush current may be understood as referring to the difference between the first inductor current $i_{L1}$ and the load current $i_O$ flowing through the load.

Further, when the load current flowing through the load decreases according to the operation of the load, the first switch $Q_1$ may be blocked and the second switch $Q_2$ may be turned on, and the state of each of the first switch $Q_1$ and the second switch $Q_2$ may be maintained while an inrush current generated by a decrease in the load current $i_O$ is present.

The auxiliary buck converter may include the third switch $Q_3$, the fourth switch $Q_4$, and the second inductor $L_2$.

The third switch $Q_3$ may be connected to the voltage source $V_{in}$, and the fourth switch $Q_4$ may be connected to the voltage source $V_{in}$ in parallel at the other end of the third switch $Q_3$.

In this regard, it may be understood that the third switch $Q_3$ is connected to a contact point of the voltage source $V_{in}$ and the first switch $Q_1$.

Further, the second inductor $L_2$ may be connected to a contact point of the third switch $Q_3$ and the fourth switch $Q_4$, and the other end of the second inductor $L_2$ may be connected to the contact point of the capacitor $C_o$ and the load.

In this regard, it may be understood that the second inductor $L_2$ is connected to a contact point of the first inductor $L_1$, the capacitor $C_o$, and the load.

In this case, a semiconductor element such as a MOSFET or the like may be used as the third switch $Q_3$ and the fourth switch $Q_4$, and as shown in FIG. 1, each MOSFET may be provided with a diode connected to the MOSFET in parallel.

Further, a constant voltage may be input to a gate of each MOSFET so that a drain and a source of the MOSFET are conductive.

In this case, a voltage may be input to the gate by the voltage source $V_{in}$, and the MOSFET may include a voltage source which inputs a voltage to the gate. Meanwhile, when the magnitude of the load current flowing through the load is constantly maintained and the first switch $Q_1$ and the second switch $Q_2$ are alternately turned on and blocked, the third switch $Q_3$ and the fourth switch $Q_4$ may be blocked.

Further, when an inrush current is generated due to a change in magnitude of the load current flowing through the load, the first switch $Q_1$ and the second switch $Q_2$ may each maintain a constant state, and the third switch $Q_3$ and the fourth switch $Q_4$ may be alternately turned on and blocked.

Meanwhile, the second inductor $L_2$ may be connected to the capacitor $C_o$ to operate as a low pass filter, and to this end, the second inductor $L_2$ and the capacitor $C_o$ may each be provided in a size sufficient to supply a stable load current to the load.

Main voltages and current waveforms of the converter system in FIG. 1 are shown in FIG. 2. When a current flowing in the second inductor $L_2$ (hereinafter, a second inductor current, $i_{L2}$) is controlled in the form of a triangular wave within a linear envelope $P_{env}$ of appropriate magnitude, high efficiency may be achieved and the ripple of the output voltage $v_O$ may be reduced through soft switching of the auxiliary circuit.

However, this method assumes that there is no time delay (delay) in a control circuit, there is no parasitic component of the converter, and the output current $i_O$ also changes in a perfect stepwise form, and thus is not suitable for implementation of an actual circuit.

In the present disclosure, even when the above-described non-ideal characteristics which occur when the actual converter is implemented, that is, delay in the control circuit, converter parasitic components, output current $i_O$ fluctuations in which the output current ($i_O$) is not the perfect stepwise form, and the like are present, two envelopes are generated and used for control so that the output voltage $v_O$ is precisely controlled (that is, the ripple is minimized). In the present disclosure, this is referred to as double envelope control.

Figure 3:
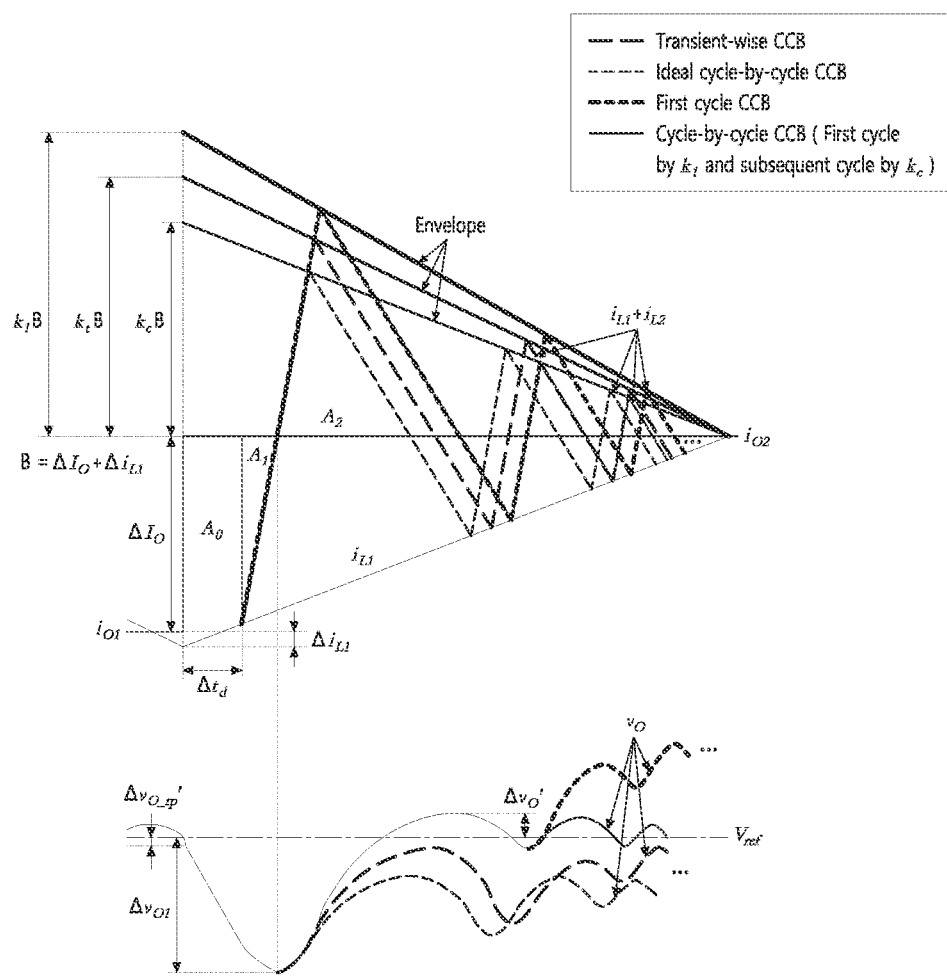
FIG. 3 is a view illustrating an example of an envelope for describing double envelope control of the present disclosure.

An example of the envelope is shown in FIG. 3. When a height of the envelope is set as $k_c B$, the second inductor current $i_{L2}$ operates as shown in a Ideal cycle-by-cycle CCB dashed line. In this case, it can be seen that the output voltage $v_O$ also operates as a dashed line at the very bottom, and the time taken to reach a target voltage $V_{ref}$, that is, a settling time is very long due to the above-described non-ideal characteristic.

In order to reduce the settling time, the envelope height may be set like $k_t B$ or $k_1 B$, which is greater than $k_c B$, and in the case of $k_t B$ (a waveform with second largest initial value, Transient-wise CCB), although the settling time is reduced, there is a limit in reduction, and when the envelope height is set as $k_1 B$ (a waveform with largest initial value, First cycle CCB), the settling time is minimized, but it can be seen that the output voltage $v_O$ is overcompensated (the output voltage $v_O$ is generated above $V_{ref}$).

Accordingly, the present disclosure proposes a control method (Cycle-by-Cycle CCB) selectively using an envelope of a height $k_1B$ to form a first triangular wave of the second inductor current $i_{L2}$ and an envelope of a height $k_cB$ to form a subsequent triangular wave. Through this manner, it is possible to minimize the ripple of the output voltage $v_O$ by removing overcompensation while minimizing the settling time.

Figure 4:
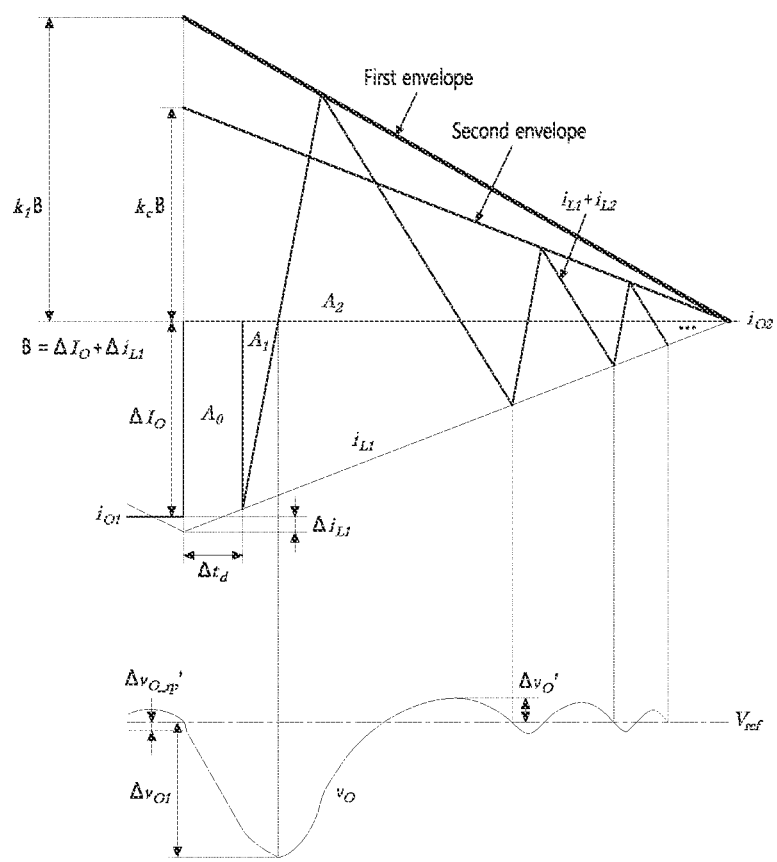
FIG. 4 is a view for describing the double envelope control according to the present disclosure.
Figure 5:
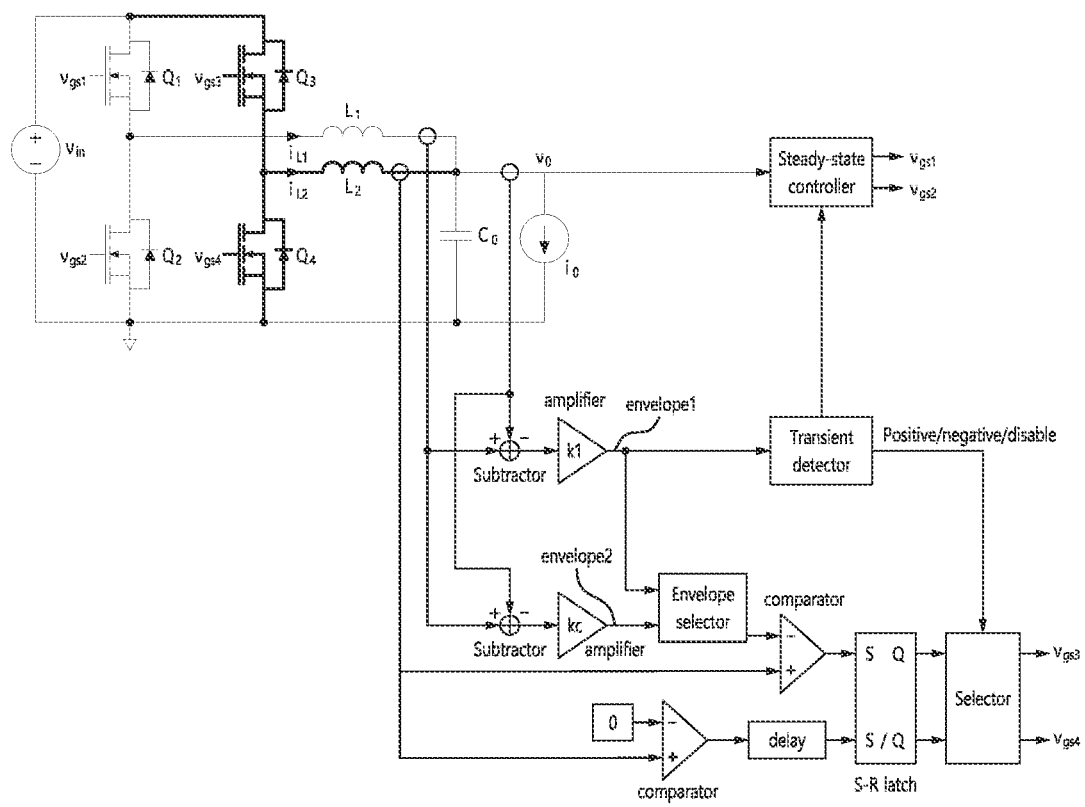
FIG. 5 illustrates examples of a circuit diagram and a control block diagram to which the present disclosure is applied.

The double envelope control according to the present disclosure is shown in FIG. 4. FIG. 5 illustrates examples of a circuit diagram and a control block diagram to which the present disclosure is applied.

The circuit diagram and the control block diagram in FIG. 5 are only examples, and the control block diagram may be implemented by various analog and digital methods.

The control of the present disclosure may be described and implemented similarly with the above manner even when the load current $i_O$ vertically drops.

In FIG. 4, a magnitude of a first envelope (an envelope with a relatively larger magnitude of the two envelopes) corresponds to $(1+k_1)*B$. A subscript 1 is given to $k_1$ in a sense that it is involved only in the first triangle of the second inductor current $i_{L2}$.

As described above, $k_1$ is designed in consideration of the non-ideal characteristics which are present in the actual converter (for example, delay ($\Delta t_d$) in the control circuit, parasitic components of circuit elements, an output current $i_O$ fluctuation waveform that is not a perfect stepwise form, and the like). For example, a case of implementation where $\Delta t_d$ is significant and the remaining non-ideal characteristics are negligible is shown in FIG. 1, and $k_1$ in this case may be expressed as the following Equation 1.

$$k_1 = \frac{\beta L_2^2(V_{in} - V_o) - \alpha V_o(L_1 + L_2)}{L_2[\alpha V_o - \beta\{L_1V_o + L_2(V_{in} - V_o)\}]}$$ [Equation 1]

$$\alpha = \sqrt{\frac{L_1^3 L_2 V_{in}[L_1 L_2 V_{in}(\Delta I_o + \Delta i_{L1})^2 +}{\Delta t_d V_o(V_{in} - V_o)\{2L_1(\Delta I_o + \Delta i_{L1}) - \Delta t_d(V_{in} - V_o)\}]}}$$

$$\beta = L_1 V_{in}\{L_1(\Delta I_o + \Delta i_{L1}) - \Delta t_d(V_{in} - V_o)\}$$

Figure 6:
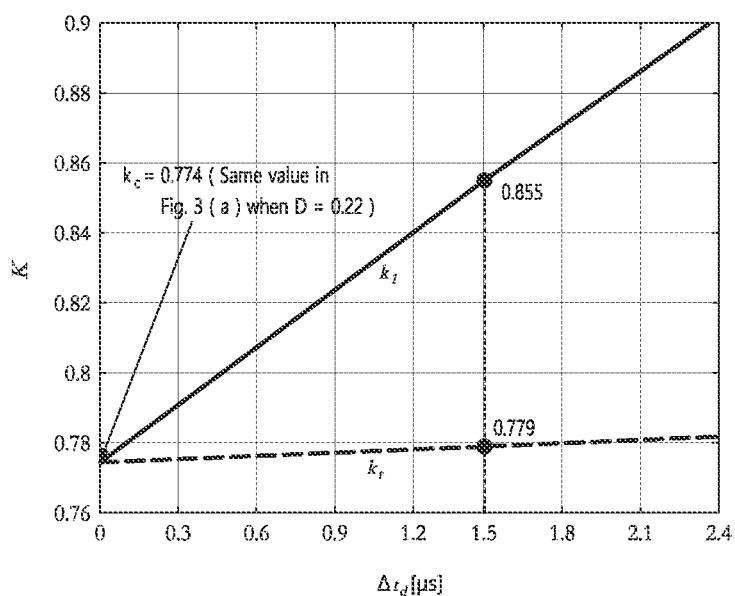
FIG. 6 is a graph illustrating the relationship between a magnitude ($k_1$) of an envelope and time delay ($\Delta t_d$)

In the above Equation, $V_{in}$ refers to an input voltage of a converter, $V_O$ refers to an output voltage of the converter, $L_1$ refers to the inductance of a main inductor (first inductor), $L_2$ refers to the inductance of an auxiliary inductor (second inductor), and $\Delta t_d$ refers to the delay of a control circuit. For example, when all circuit design details are as shown in the following Table 1, the relationship between the magnitude $k_1$ of the envelope and the time delay $\Delta t_d$ is shown as a solid line in a graph in FIG. 6.

TABLE 1

| Parameter | Description |
|---|---|
| $V_{in}$ | 15 V |
| $V_O$ | 3.3 V |
| D | 0.22 |
| $i_{O1}$ | 4 A |
| $i_{O2}$ | 15 A |
| Switching frequency (f) of $Q_1$ and $Q_2$ | 200 kHz |
| $L_1$ | 10 µH |
| $L_2$ | 500 nH |
| $C_O$ | 220 µF |

Figure 7A:
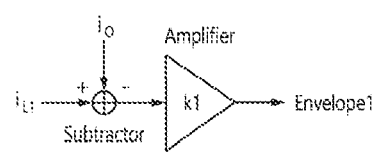
FIG. 7A illustrates $k_1$ in the control block diagram in FIG. 5.
Figure 7B:
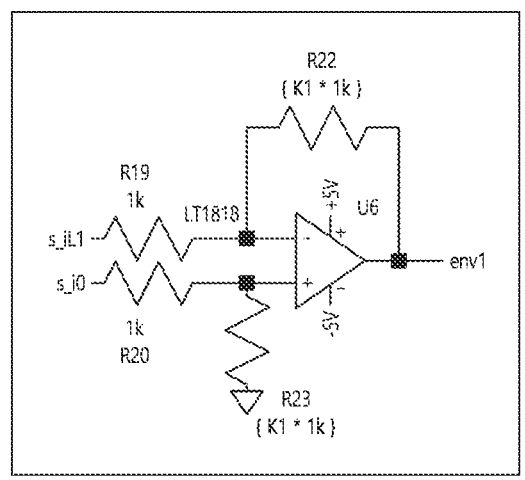
FIG. 7B illustrates an example of a circuit for implementing $k_1$.

In the embodiment of the present disclosure, the first envelope may be implemented by an analog circuit or a digital code instruction, and for example, a configuration of the analog circuit may be implemented as shown in FIGS. 7A and 7B.

FIG. 7A illustrates $k_1$ in the control block diagram in FIG. 5, and FIG. 7B illustrates an example of a circuit for implementing $k_1$.

FIG. 7B illustrates a differential amplifier circuit, wherein s_iL1 refers to a main inductor current detection value and s_iO refers to an output current detection value. In the case in which resistance values of resistors R19 and R20 are selected as 1 kΩ, the first envelope env1 may be output when resistance values of resistors R22 and R23 are designed as $k_1*1$ kΩ.

In FIG. 4, a magnitude of a second envelope (an envelope with a smaller magnitude of the two envelopes) corresponds to $(1+k_c)*B$. $k_c$ is involved only in second and subsequent triangles of the second inductor current $i_{L2}$, and a subscript c is given in a sense that the output voltage $v_O$ returns to the target voltage $V_{ref}$ in each triangle (cycle-by-cycle). Since the non-ideal characteristics are reflected in the first envelope, $k_c$ may be designed as in the following Equation 2 by assuming an ideal converter.

$$k_e = \frac{L_1 V_o - L_2(V_{in} - 2V_o)}{L_1 V_o + L_2(V_{in} - 2V_o)}$$ [Equation 2]

Figure 8:
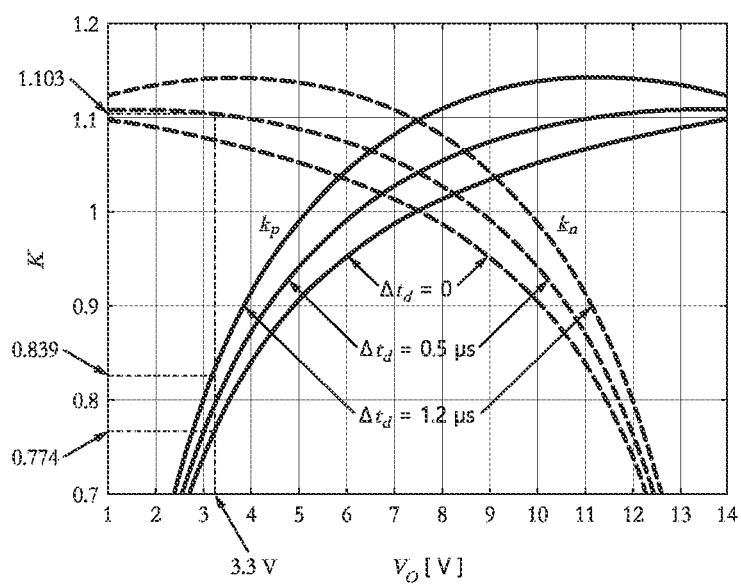
FIG. 8 is a graph illustrating the relationship between a magnitude ($k_c$) of the envelope and an output voltage ($v_o$)

When design specifications of the circuit are the same as in Table 1, the relationship between $k_c$ and the output voltage $v_O$ is the same as in the case in which $\Delta t_d=0$ in the graph in FIG. 8. FIG. 8 is a graph illustrating the relationship between the magnitude $k_c$ of the envelope and the output voltage $v_O$. Here, $k_p$ is $k_c$ when the output current vertically increases, and $k_n$ is $k_c$ when the output current vertically decreases.

Figure 9A:
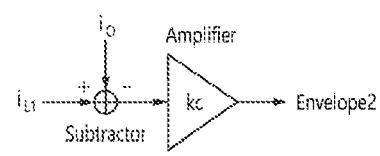
FIG. 9A illustrates $k_c$ in the control block diagram in FIG. 5.
Figure 9B:
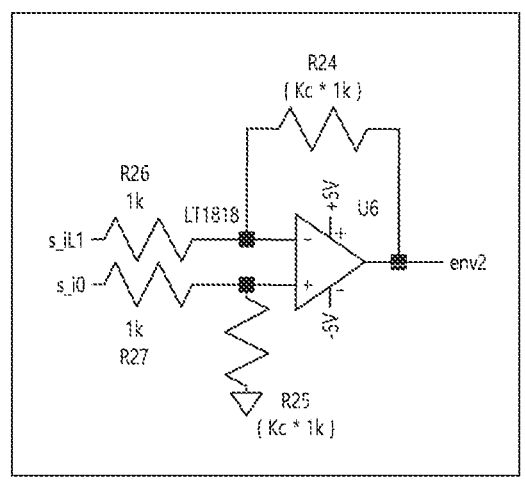
FIG. 9B illustrates an example of a circuit for implementing $k_c$.

In the embodiment of the present disclosure, the second envelope may be implemented by an analog circuit or a digital code instruction, and for example, a configuration of the analog circuit may be implemented as shown in FIGS. 9A and 9B.

FIG. 9A illustrates $k_c$ in the control block diagram in FIG. 5, and FIG. 9B illustrates an example of a circuit for implementing $k_c$.

FIG. 9B illustrates a differential amplifier circuit, wherein s_iL1 refers to a main inductor current detection value and s_iO refers to an output current detection value. In the case in which resistance values of resistors R26 and R27 are selected as 1 kΩ, the second envelope env2 may be output when resistance values of resistors R24 and R25 are designed as $k_1*1$ kΩ.

Hereinafter, a simulation performed to verify the performance of the present disclosure will be described. Simulation conditions are shown in Table 1.

Figure 10A:
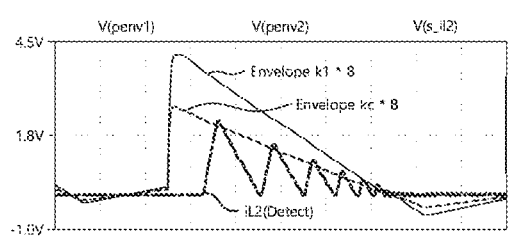
FIG. 10A illustrates a simulation result of single envelope control.
Figure 10A:
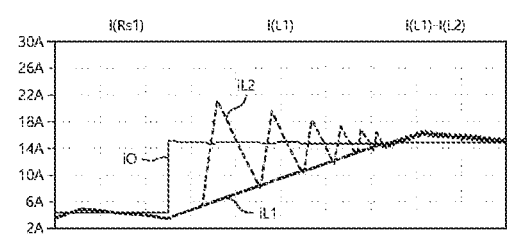
Figure 10A:
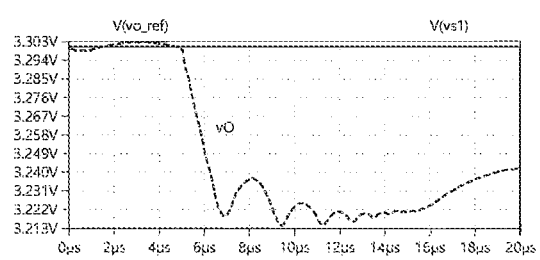
Figure 10B:
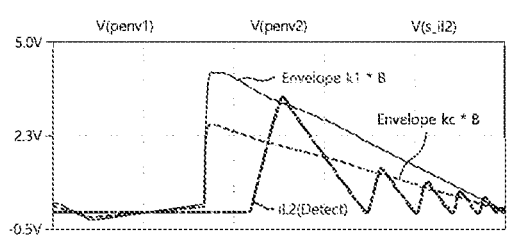
FIG. 10B illustrates a simulation result of the double envelope control according to the present disclosure.
Figure 10B:
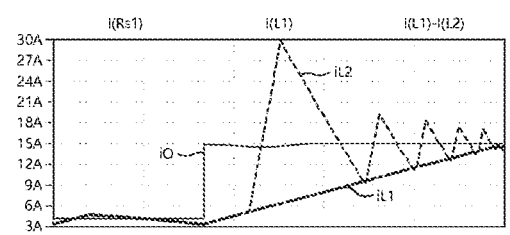
Figure 10B:
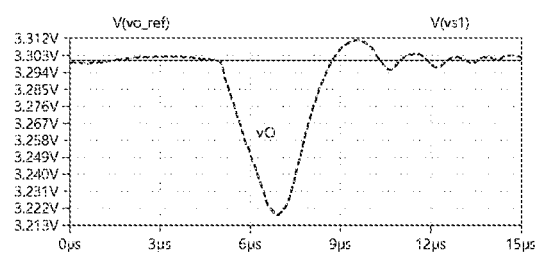

A simulation result is shown in FIGS. 10A and 10B.

FIG. 10A illustrates a simulation result of single envelope control, and FIG. 10B illustrates a simulation result of the double envelope control according to the present disclosure.

Referring to FIGS. 10A and 10B, it can be seen that the double envelope control according to the present disclosure significantly reduces the settling time of the output voltage $v_O$ compared to the single envelope control.

Accordingly, the present disclosure minimizes the ripple of the output voltage through the double envelope control.

Further, a control technique in the present disclosure is applicable to various converter circuits other than the buck converter.

Figure 11:
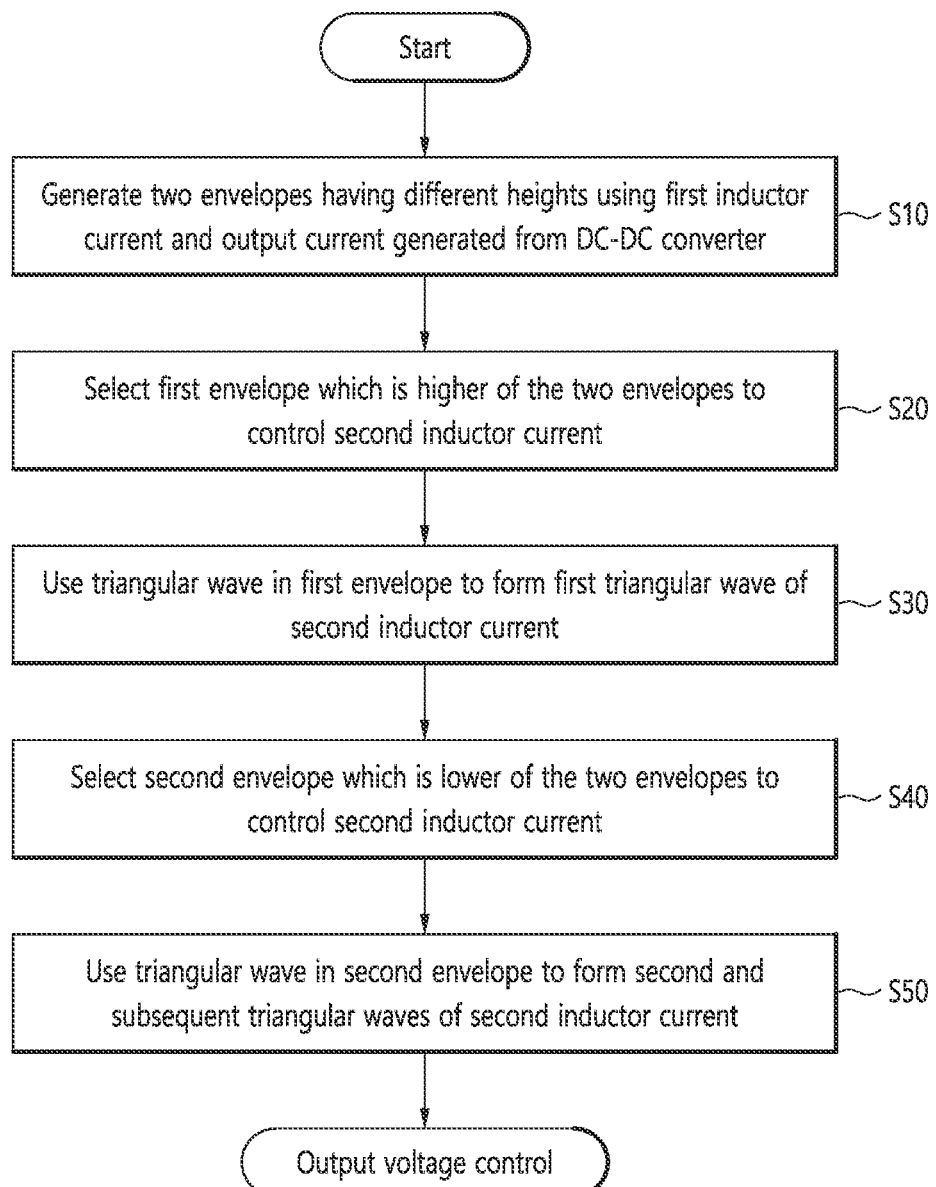
FIG. 11 is a flow chart of a method of controlling a DC-DC converter for reducing an output voltage ripple according to one embodiment of the present disclosure.

FIG. 11 is a flow chart of a method of controlling a DC-DC converter for reducing an output voltage ripple according to one embodiment of the present disclosure.

A method of driving the auxiliary circuit for reducing the output voltage ripple of the DC-DC converter according to the embodiment may be performed in substantially the same configuration as that of the DC-DC converter in FIG. 1. Accordingly, the same reference numerals are given to the same components as those of the DC-DC converter in FIG. 1, and repeated descriptions are omitted.

Further, the method of controlling the DC-DC converter for reducing the output voltage ripple according to the embodiment may be executed by software (an application) for performing DC-DC converter control for reducing the output voltage ripple.

When the load current (the output current) of the converter fluctuates, the output voltage of the converter does not maintain a constant value and fluctuates, and the present disclosure proposes a method of controlling the DC-DC converter in order to suppress this fluctuation (ripple).

The method of controlling the DC-DC converter for reducing the output voltage ripple according to the embodiment of the present disclosure may be performed through an auxiliary buck converter connected to a main buck converter in parallel. The main buck converter and the auxiliary buck converter may have the circuits of the same type.

Referring to FIG. 11, in the method of controlling the DC-DC converter for reducing the output voltage ripple according to the embodiment, two envelopes with different heights by using a first inductor current and an output current generated from the DC-DC converter are generated (Operation S10).

In the present disclosure, even when the above-described non-ideal characteristics which occur when an actual converter is implemented, that is, delay in the control circuit, converter parasitic components, output current $i_O$ fluctuations in which the output current ($i_O$) is not a perfect stepwise form, and the like are present, two envelopes are generated and used for control so that the output voltage $v_O$ is precisely controlled (that is, the ripple is minimized). In the present disclosure, this is referred to as double envelope control.

The operation of generating two envelopes with different heights may be implemented by either an analog circuit or a digital code instruction.

A first envelope, which is higher of the two envelopes, is selected to control a second inductor current (Operation S20). A triangular wave in the first envelope is used to form a first triangular wave of the second inductor current (Operation S30).

A second envelope, which is lower of the two envelopes, is selected to control a second inductor current (Operation S40). A triangular wave in the second envelope is used to form the second and subsequent triangular waves of the second inductor current (Operation S50).

Accordingly, the present disclosure proposes a control method selectively using the envelope of a relatively high height to form the first triangular wave of the second inductor current $i_{L2}$ and the envelope of a relatively low height to form the subsequent triangular waves. Accordingly, it is possible to minimize the ripple of the output voltage $v_O$ by removing overcompensation while minimizing the settling time.

The method of driving the auxiliary circuit for reducing the output voltage ripple of the DC-DC converter may be implemented by either an application or in the form of program instructions which may be executed through various computer components to be recorded in a computer-readable recording medium. The computer-readable recording medium may include program instructions, data files, data structures, or the like alone or in combination.

The program instructions recorded on the computer-readable recording medium are specially designed and configured for the present disclosure, and may be known and used by those skilled in the field of computer software.

Examples of the computer-readable recording medium include magnetic media such as a hard disk, a floppy disk, and a magnetic tape, optical recording media such as a CD-ROM and a DVD, and magneto-optical media such as a floptical disk, and hardware devices such as a read only memory (ROM), a random access memory (RAM), a flash memory, and the like specially configured to store and execute program instructions.

Examples of the program instructions include not only machine language code such as that generated by a compiler, but also high-level language code which may be executed by a computer using an interpreter or the like. The hardware device may be configured to operate as one or more software modules for performing the processing according to the present disclosure, and vice versa.

According to a DC-DC converter for reducing an output voltage ripple and a method of controlling the same, a ripple of an output voltage generated when a load current (output current) of a converter fluctuates can be minimized through double envelope control. Further, according to high-efficiency and high-precision driving of an auxiliary circuit proposed in the present disclosure, a ripple of an output voltage can be precisely suppressed to a very low level while increasing the driving efficiency of an auxiliary circuit itself.

In the above, although the present disclosure is described with reference to the embodiments of the present disclosure, those skilled in the art may variously modify and change the present disclosure within a range not departing from the spirit and area of the present disclosure disclosed in the claims which will be described below.

Industrial Applicability

The present disclosure minimizes a ripple of an output voltage through double envelope control, and thus can be usefully used for high-precision and high-efficiency converter control. Further, a control method in the present disclosure is applicable to various converter circuits other than a buck converter.

What is claimed is:

1. A DC-DC converter for reducing an output voltage ripple, comprising:
   a capacitor configured to perform charging and discharging;
   a main buck converter including:
      a first switch and a second switch connected to a voltage source, and
      a first inductor connected between the capacitor and a contact point of the first switch and the second switch, the first inductor having a first inductor current that flows therethrough; and
   an auxiliary buck converter including:
      a third switch and a fourth switch respectively connected to the first switch and the second switch in parallel, and a second inductor connected between the capacitor and a contact point of the third switch and the fourth switch, the second inductor having a second inductor current that flows therethrough, wherein the auxiliary buck converter is configured to control the second inductor current by generating two envelopes with different heights to compensate for a difference between the first inductor current and an output current, wherein the auxiliary buck converter controls the second inductor current by selectively using the two envelopes, wherein the auxiliary buck converter selects and controls a higher envelope of the two envelopes to form a first triangular wave of the second inductor current, and wherein the auxiliary buck converter selects and controls a lower envelope of the two envelopes to form a second and subsequent triangular waves of the second inductor current.

2. The DC-DC converter of claim 1, wherein the auxiliary buck converter controls an output voltage to be constant even when the output current fluctuates.

3. A DC-DC converter for reducing an output voltage ripple, comprising:
a capacitor configured to perform charging and discharging;
a main buck converter including:
a first switch and a second switch connected to a voltage source, and
a first inductor connected between the capacitor and a contact point of the first switch and the second switch, the first inductor having a first inductor current that flows therethrough; and
an auxiliary buck converter including:
a third switch and a fourth switch respectively connected to the first switch and the second switch in parallel, and
a second inductor connected between the capacitor and a contact point of the third switch and the fourth switch, the second inductor having a second inductor current that flows therethrough, wherein the auxiliary buck converter is configured to control the second inductor current by generating two envelopes with different heights to compensate for a difference between the first inductor current and an output current current, and wherein the auxiliary buck converter further includes:
a first envelope generator configured to generate a first envelope by using the first inductor current and the output current; and
a second envelope generator configured to generate a second envelope by using the first inductor current and the output current.

4. The DC-DC converter of claim 3, wherein the first envelope generator and the second envelope generator are implemented by either an analog circuit or a digital code instruction.

5. A method of controlling a DC-DC converter to reduce an output voltage ripple through an auxiliary buck converter connected to a main buck converter in parallel, the method comprising:
generating two envelopes with different heights by using a first inductor current and an output current generated from the DC-DC converter;
selecting a first envelope, which is higher of the two envelopes, to control a second inductor current;
using a triangular wave in the first envelope to form a first triangular wave of the second inductor current;
selecting a second envelope, which is lower of the two envelopes, to control the second inductor current; and
using a triangular wave in the second envelope to form a second and subsequent triangular waves of the second inductor current.

6. The method of claim 5, wherein the generating the two envelopes with different heights is implemented by either an analog circuit or a digital code instruction.

* * * * *